United States Patent
Clément et al.

(10) Patent No.: US 7,169,909 B2
(45) Date of Patent: Jan. 30, 2007

(54) PHTHALIMIDYLAZO DYES, PROCESSESS FOR THE PREPARATION THEREOF AND THE USE THEREOF

(75) Inventors: Antoine Clément, Basel (CH); Alfons Arquint, Basel (CH); Urs Lauk, Zürich (CH)

(73) Assignee: Ciba Specialty Chemicals Corporation, Tarrytown, NY (US)

( * ) Notice: Subject to any disclaimer, the term of this patent is extended or adjusted under 35 U.S.C. 154(b) by 0 days.

(21) Appl. No.: 10/538,892

(22) PCT Filed: Dec. 8, 2003

(86) PCT No.: PCT/EP03/50956

§ 371 (c)(1),
(2), (4) Date: Jun. 14, 2005

(87) PCT Pub. No.: WO2004/056926

PCT Pub. Date: Jul. 8, 2004

(65) Prior Publication Data

US 2006/0046596 A1  Mar. 2, 2006

(30) Foreign Application Priority Data

Dec. 19, 2002  (EP) ................... 02406118

(51) Int. Cl.
*C09B 29/036* (2006.01)
*C09B 29/42* (2006.01)
*C09B 67/22* (2006.01)
*D06P 1/18* (2006.01)

(52) U.S. Cl. ............. 534/766; 8/466; 8/696; 8/922

(58) Field of Classification Search ........ 534/766; 8/466, 696, 922
See application file for complete search history.

(56) References Cited

U.S. PATENT DOCUMENTS

| 3,923,776 A | 12/1975 | Gnad | 260/156 |
| 4,133,806 A | 1/1979 | Gnad | 126/156 |
| 2004/0097716 A1 | 5/2004 | Clement et al. | 534/787 |
| 2004/0116681 A1 | 6/2004 | Clement et al. | 534/787 |
| 2005/0176857 A1 | 8/2005 | Dreier et al. | 524/90 |

FOREIGN PATENT DOCUMENTS

| GB | 1 302 221 | 1/1973 |
| JP | 52085584 | 7/1977 |
| JP | 53119930 | 10/1978 |
| JP | 53138431 | 12/1978 |
| JP | 53138432 | 12/1978 |

OTHER PUBLICATIONS

English Abstract AN-1977-61950Y [35] for JP 52085584 (1977).
English Abstract AN-1979-04691B [25] for JP 53138431 (1979).
English Abstract AN-1978-84875A [47] for JP 53119930 (1978).
English Abstract AN-1979-04692B {03} for JP 53138432 (1979).

*Primary Examiner*—Fiona T. Powers

(57) ABSTRACT

The present invention relates to dyes of formula (I) wherein $R_1$ is $C_1$–$C_{12}$alkyl or —$C_nH_{2n}$—$(OCH_2CH_2)_m$—$OR_3$, n being a number from 2 to 8, m being a number from 0 to 4 and $R_3$ being $C_1$–$C_{12}$alkyl, $C_6$–$C_{24}$aryl or $C_6$–$C_{24}$aralkyl, $R_2$ is methyl, ethyl, n-propyl, n-butyl, 2-methoxyethyl or 2-ethoxyethyl, X is halogen and Y is hydrogen, chlorine or bromine, and to the process for the preparation thereof and to the use thereof in dyeing or printing semi-synthetic and especially synthetic hydrophobic fiber materials, more especially textile materials

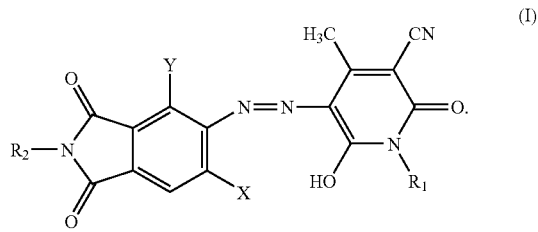

(I)

10 Claims, No Drawings

PHTHALIMIDYLAZO DYES, PROCESSESS FOR THE PREPARATION THEREOF AND THE USE THEREOF

The present invention relates to disperse dyes having an N-alkyl-phthalimide diazo component and a pyridone coupling component, to processes for the preparation of such dyes and to the use thereof in dyeing or printing semi-synthetic and especially synthetic hydrophobic fibre materials, more especially textile materials.

Disperse azo dyes having an N-alkyl-phthalimide diazo component and a pyridone coupling component have been known for a long time and are used in dyeing hydrophobic fibre materials. It has, however, been found that the dyeings or prints obtained using the currently known dyes do not in all cases satisfy today's requirements, especially in respect of fastness to washing and fastness to perspiration. There is therefore a need for new dyes that especially have good washing fastness properties.

It has now been found, surprisingly, that the dyes according to the invention meet the criteria given above to a considerable degree.

The present invention accordingly relates to disperse dyes that yield dyeings having a high degree of fastness to washing and to perspiration and that, in addition, have good build-up characteristics both in the exhaust and thermosol processes and in textile printing. The dyes are also suitable for discharge printing.

The dyes according to the Invention correspond to formula

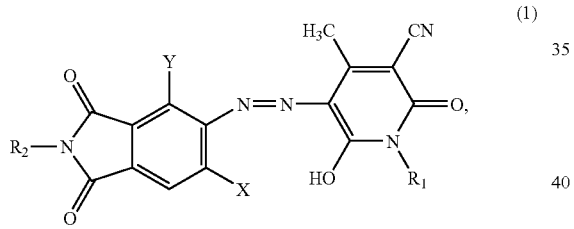

wherein $R_1$ is $C_1$–$C_{12}$alkyl or —$C_nH_{2n}$—(OCH$_2$CH$_2$)$_m$—OR$_3$, n being a number from 2 to 8, M being a number from 0 to 4 and $R_3$ being $C_1$–$C_{12}$alkyl, $C_6$–$C_{24}$aryl or $C_6$–$C_{24}$aralkyl, $R_2$ is methyl, ethyl, n-propyl, n-butyl, 2-methoxyethyl or 2-ethoxyethyl, X is halogen and Y Is hydrogen, chlorine or bromine.

$C_1$–$C_{12}$Alkyl as $R_1$ and $R_3$ may be, for example, methyl, ethyl, n-propyl, isopropyl, n-butyl, iso-butyl, sec-butyl, tert-butyl, n-pentyl, neopentyl, n-hexyl, n-octyl, n-decyl or n-dodecyl.

$C_6$–$C_{24}$Aryl groups as $R_3$ are, for example, phenyl, tolyl, mesityl, isityl, naphthyl and anthryl.

Suitable $C_6$–$C_{24}$aralkyl groups are, for example, benzyl and 2-phenylethyl.

Preference is given to dyes of formula (1) wherein $R_1$ is methyl, ethyl or n-butyl.

$R_2$ is preferably n-butyl.

Halogen as X is fluorine, chlorine or, preferably, bromine.

Y is preferably hydrogen.

Special reference is given to dyes of formulae (1a), (1b) and (1c)

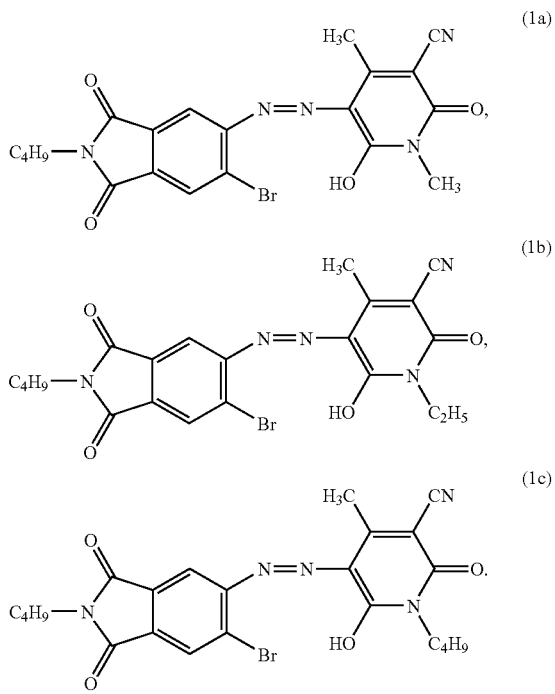

The present invention relates also to the process for the preparation of the dyes of formula (1), which comprises nitration of a phthalimide of formula

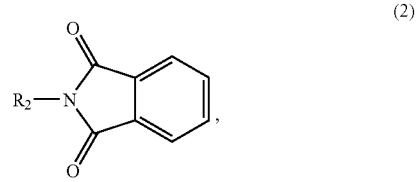

wherein $R_2$ is as defined hereinbefore, in the acid range, as described, for example, on page 459 in Organic Synthesis, Collective Volume 2, (a Revised Edition of Annual Volumes X–XIX), J. Wiley & Sons, followed by alkylaton of the resulting nitro compound, for example in accordance with a method described in Journal of Organic Chemistry 32 (1967) on page 1923, paragraph 3, and, for example after a reductive treatment described In Bull. Soc. Chim. de France 1957 on page 569, conversion into an intermediate of formula

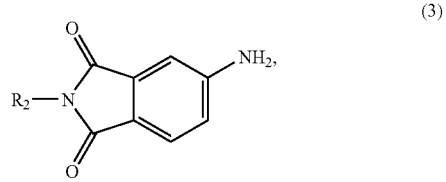

halogenation of the intermediate of formula (3) in an acid medium and then diazotisation and coupling to a pyridone compound of formula (4)

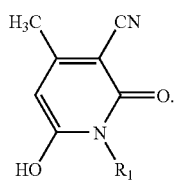
(4)

wherein R₁ is as defined hereinbefore.

The halogenation is carried out, for example, by reacting the compound of formula (3) first with sodium acetate in acetic acid and then with bromine in the same medium to form the corresponding monobromo compound.

The diazotisation is likewise carried out in a manner known per se, for example with sodium nitrite in an acidic, for example hydrochloric-acid-containing or sulfuric-acid-containing, aqueous medium. The diazotisation may, however, also be carried out using other diazotisation agents, e.g. using nitrosylsulfuric acid. In the diazotisation, an additional acid may be present in the reaction medium, e.g. phosphoric acid, sulfuric acid, acetic acid, propionic acid, hydrochloric acid or mixtures of such acids, e.g. mixtures of propionic acid and acetic acid. The diazotisation is advantageously carried out at temperatures of from −10 to 30° C., e.g. from −10° C. to room temperature.

The coupling of the diazotised compound to the coupling component of formula (4) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric add.

The diazo components and the coupling components of formula (4) are known or can be prepared in a manner known per se.

The present invention relates also to dye mixtures comprising at least two structurally different azo dyes of formula (1).

The dye mixtures according to the invention comprising at least two structurally different azo dyes of formula (1) can be prepared, for example, by simply mixing the individual dyes.

The amounts of the individual dyes in the dye mixtures according to the invention can vary within a wide range, for example from 95:5 to 5:95 parts by weight, especially from 70:30 to 30:70 parts by weight, more especially from 55:45 to 45:55 parts by weight, of the individual dyes in a dye mixture comprising two azo dyes according to the invention.

The dyes and dye mixtures according to the invention may be used for dyeing or printing semi-synthetic and especially synthetic hydrophobic fibre materials, more especially textile materials. Textile materials composed of blend fabrics that comprise such semi-synthetic or synthetic hydrophobic fibre materials can also be dyed or printed using the dyes or dye mixtures according to the invention.

Semi-synthetic fibre materials that come into consideration are, especially, cellulose 2½ acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, e.g. those of α,α-dimethyl-4,4-dihydroxy-diphenylmethane and phosgene, and of fibres based on polyvinyl chloride or on polyamide.

The application of the dyes and dye mixtures according to the invention to the fibre materials is effected in accordance with known dyeing methods. For example, polyester fibre materials are dyed in the exhaust process from an aqueous dispersion in the presence of customary anionic or non-ionic dispersants and, optionally, customary swelling agents (carriers) at temperatures of from 80 to 140° C. Cellulose 2½ acetate is dyed preferably at from 65 to 85° C. and cellulose triacetate at temperatures of from 65 to 115° C.

The dyes and dye mixtures according to the invention will not colour wool and cotton present at the same time in the dyebath or will colour such materials only slightly (very good reservation) so that they can also be used satisfactorily in the dyeing of polyester/wool and polyester/cellulosic fibre blend fabrics.

The dyes and dye mixtures according to the invention are suitable for dyeing in accordance with the thermosol process, in the exhaust process and for printing processes.

In such processes, the said fibre materials can be in a variety of processing forms, e.g. in the form of fibres, yarns or nonwoven, woven or knitted fabrics.

It is advantageous to convert the dyes or dye mixtures according to the invention into a dye preparation prior to use. For this purpose, the dye is ground so that its particle size is on average from 0.1 to 10 microns. Grinding can be carried out in the presence of dispersants. For example, the dried dye is ground together with a dispersant or kneaded into a paste form together with a dispersant and then dried in vacuo or by atomisation. After adding water, the resulting preparations can be used to prepare printing pastes and dyebaths.

For printing, the customary thickeners will be used, e.g. modified or unmodified natural products, for example alginates, British gum, gum arabic, crystal gum, locust bean flour, tragacanth, carboxymethyl cellulose, hydroxyethyl cellulose, starch or synthetic products, for example polyacrylamides, polyacrylic acid or copolymers thereof, or polyvinyl alcohols.

The dyes and dye mixtures according to the invention impart to the said materials, especially to polyester materials, level colour shades having very good in-use fastness properties such as, especially, good fastness to light, fastness to heat setting, fastness to pleating, fastness to chlorine, and wet fastness, e.g. fastness to water, to perspiration and to washing; the finished dyeings are further characterised by very good fastness to rubbing. Special emphasis should be given to the good fastness properties of the dyeings obtained with respect to perspiration and, especially, to washing.

The dyes and dye mixtures according to the invention can also be used satisfactorily in producing mixed shades together with other dyes.

Furthermore, the dyes and dye mixtures according to the invention are also well suited to dyeing hydrophobic fibre materials from supercritical $CO_2$.

The present invention relates to the above-mentioned use of the dyes and dye mixtures according to the invention as well as to a process for the dyeing or printing of semi-synthetic or synthetic hydrophobic fibre materials, especially textile materials, in which process a dye according to the invention is applied to the said materials or incorporated into them. The said hydrophobic fibre materials are preferably textile polyester materials. Further substrates that can be treated by the process according to the invention and preferred process conditions can be found hereinbefore in the more detailed description of the use of the dyes according to the invention.

The invention relates also to hydrophobic fibre materials, preferably polyester textile materials, dyed or printed by the said process.

The dyes according to the invention are, in addition, suitable for modem reproduction processes, e.g. thermotransfer printing.

The Examples that follow serve to illustrate the invention. Parts therein are parts by weight and percentages are percentages by weight, unless otherwise indicated. Temperatures are given in degrees Celsius. The relationship between parts by weight and parts by volume is the same as between grams and cubic centimetres.

I. PREPARATION EXAMPLES

Example I.1

A. Diazotisation 5 ml of 96% sulfuric acid are transferred to a laboratory reaction apparatus. With stirring, 2.7 ml of ice-water are slowly added dropwise so that the internal temperature is 25–30° C. Then, over the course of 20 minutes, 3.0 g of 4-amino-5-bromo-N-butylphthalimide are introduced. The resulting suspension is stirred for 10 minutes at an internal temperature of 25–30° C. Then, over the course of 15 minutes, 1.75 ml of 40% nitrosylsulfuric acid are added dropwise at an internal temperature of 20–25° C. and stirred for 2 hours at that temperature.

B. Coupling

A solution of 3 drops of Surfynol 104 E (2,4,7,9-tetramethyl-5-decyne-4,7-diol) in 150 ml of water is transferred to a laboratory reaction apparatus having a pH meter. With stirring, 1.8 g of 1-ethyl-3-cyano-4-methyl-6-hydroxy-2-pyridone are Introduced. Then 3 ml of 10% NaOH are added (pH=10–12). The resulting solution is cooled to 10° C., and the solution of the diazonium salt is added dropwise over the course of about 30 minutes so that the internal temperature is 10–15° C., the pH being maintained at 2–3 by dropwise addition of 70 ml of 10% NaOH. The resulting yellow suspension is stirred for 1 hour at 10–15° C. The solid is filtered off under suction, washed with deionised water and dried. 4.7 g (86% of Theory) of the Compound of Formula (1b)

are obtained.
Melting point: >150° C.
Appearance: yellow-green

Analogously to Example I.1, the following dyes can be prepared, which are likewise suitable for dyeing semi-synthetic or synthetic hydrophobic fibre materials (Table 1):

TABLE 1

| X | Y | $R_1$ | $R_2$ |
|---|---|---|---|
| Br | H | $CH_3$ | $CH_3$ |
| Br | H | $CH_3$ | $C_2H_5$ |
| Br | H | $CH_3$ | $n\text{-}C_3H_7$ |
| Br | H | $CH_3$ | $n\text{-}C_4H_9$ |
| Br | H | $CH_3$ | $—CH_2CH_2OCH_3$ |
| Br | H | $CH_3$ | $—CH_2CH_2OC_2H_5$ |
| Br | H | $C_2H_5$ | $CH_3$ |
| Br | H | $C_2H_5$ | $C_2H_5$ |
| Br | H | $C_2H_5$ | $n\text{-}C_3H_7$ |
| Br | H | $C_2H_5$ | $n\text{-}C_4H_9$ |
| Br | H | $C_2H_5$ | $—CH_2CH_2OCH_3$ |
| Br | H | $C_2H_5$ | $—CH_2CH_2OC_2H_5$ |
| Br | H | $n\text{-}C_3H_7$ | $CH_3$ |
| Br | H | $n\text{-}C_3H_7$ | $C_2H_5$ |
| Br | H | $n\text{-}C_3H_7$ | $n\text{-}C_3H_7$ |
| Br | H | $n\text{-}C_3H_7$ | $n\text{-}C_4H_9$ |
| Br | H | $n\text{-}C_3H_7$ | $—CH_2CH_2OCH_3$ |
| Br | H | $n\text{-}C_3H_7$ | $—CH_2CH_2OC_2H_5$ |
| Br | H | $n\text{-}C_4H_9$ | $CH_3$ |
| Br | H | $n\text{-}C_4H_9$ | $C_2H_5$ |
| Br | H | $n\text{-}C_4H_9$ | $n\text{-}C_3H_7$ |
| Br | H | $n\text{-}C_4H_9$ | $n\text{-}C_4H_9$ |
| Br | H | $n\text{-}C_4H_9$ | $—CH_2CH_2OCH_3$ |
| Br | H | $n\text{-}C_4H_9$ | $—CH_2CH_2OC_2H_5$ |
| Br | H | $—CH_2CH_2OCH_3$ | $CH_3$ |
| Br | H | $—CH_2CH_2OCH_3$ | $C_2H_5$ |
| Br | H | $—CH_2CH_2OCH_3$ | $n\text{-}C_3H_7$ |
| Br | H | $—CH_2CH_2OCH_3$ | $n\text{-}C_4H_9$ |
| Br | H | $—CH_2CH_2OCH_3$ | $—CH_2CH_2OCH_3$ |
| Br | H | $—CH_2CH_2OCH_3$ | $—CH_2CH_2OC_2H_5$ |
| Br | H | $—CH_2CH_2CH_2OCH_2CH_2OCH_3$ | $CH_3$ |
| Br | H | $—CH_2CH_2CH_2OCH_2CH_2OCH_3$ | $C_2H_5$ |
| Br | H | $—CH_2CH_2CH_2OCH_2CH_2OCH_3$ | $n\text{-}C_3H_7$ |
| Br | H | $—CH_2CH_2CH_2OCH_2CH_2OCH_3$ | $n\text{-}C_4H_9$ |
| Br | H | $—CH_2CH_2CH_2OCH_2CH_2OCH_3$ | $—CH_2CH_2OCH_3$ |
| Br | H | $—CH_2CH_2CH_2OCH_2CH_2OCH_3$ | $—CH_2CH_2OC_2H_5$ |
| Br | H | $—CH_2CH_2CH_2OCH_2CH_2O\text{-}C_6H_5$ | $CH_3$ |
| Br | H | $—CH_2CH_2CH_2OCH_2CH_2O\text{-}C_6H_5$ | $C_2H_5$ |
| Br | H | $—CH_2CH_2CH_2OCH_2CH_2O\text{-}C_6H_5$ | $n\text{-}C_3H_7$ |
| Br | H | $—CH_2CH_2CH_2OCH_2CH_2O\text{-}C_6H_5$ | $n\text{-}C_4H_9$ |
| Br | H | $—CH_2CH_2CH_2OCH_2CH_2O\text{-}C_6H_5$ | $—CH_2CH_2OCH_3$ |

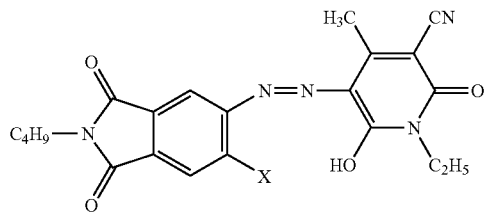

TABLE 1-continued

![structure]

| X | Y | R₁ | R₂ |
|---|---|----|----|
| Br | H | —CH₂CH₂CH₂OCH₂CH₂O—Ph | —CH₂CH₂OC₂H₅ |
| Br | Br | CH₃ | CH₃ |
| Br | Br | CH₃ | C₂H₅ |
| Br | Br | CH₃ | n-C₃H₇ |
| Br | Br | CH₃ | n-C₄H₉ |
| Br | Br | CH₃ | —CH₂CH₂OCH₃ |
| Br | Br | CH₃ | —CH₂CH₂OC₂H₅ |
| Br | Br | C₂H₅ | CH₃ |
| Br | Br | C₂H₅ | C₂H₅ |
| Br | Br | C₂H₅ | n-C₃H₇ |
| Br | Br | C₂H₅ | n-C₄H₉ |
| Br | Br | C₂H₅ | —CH₂CH₂OCH₃ |
| Br | Br | C₂H₅ | —CH₂CH₂OC₂H₅ |
| Br | Br | n-C₃H₇ | CH₃ |
| Br | Br | n-C₃H₇ | C₂H₅ |
| Br | Br | n-C₃H₇ | n-C₃H₇ |
| Br | Br | n-C₃H₇ | n-C₄H₉ |
| Br | Br | n-C₃H₇ | —CH₂CH₂OCH₃ |
| Br | Br | n-C₃H₇ | —CH₂CH₂OC₂H₅ |
| Br | Br | n-C₄H₉ | CH₃ |
| Br | Br | n-C₄H₉ | C₂H₅ |
| Br | Br | n-C₄H₉ | n-C₃H₇ |
| Br | Br | n-C₄H₉ | n-C₄H₉ |
| Br | Br | n-C₄H₉ | —CH₂CH₂OCH₃ |
| Br | Br | n-C₄H₉ | —CH₂CH₂OC₂H₅ |
| Br | Br | —CH₂CH₂OCH₃ | CH₃ |
| Br | Br | —CH₂CH₂OCH₃ | C₂H₅ |
| Br | Br | —CH₂CH₂OCH₃ | n-C₃H₇ |
| Br | Br | —CH₂CH₂OCH₃ | n-C₄H₉ |
| Br | Br | —CH₂CH₂OCH₃ | —CH₂CH₂OCH₃ |
| Br | Br | —CH₂CH₂OCH₃ | —CH₂CH₂OC₂H₅ |
| Br | Br | —CH₂CH₂CH₂OCH₂CH₂OCH₃ | CH₃ |
| Br | Br | —CH₂CH₂CH₂OCH₂CH₂OCH₃ | C₂H₅ |
| Br | Br | —CH₂CH₂CH₂OCH₂CH₂OCH₃ | n-C₃H₇ |
| Br | Br | —CH₂CH₂CH₂OCH₂CH₂OCH₃ | n-C₄H₉ |
| Br | Br | —CH₂CH₂CH₂OCH₂CH₂OCH₃ | —CH₂CH₂OCH₃ |
| Br | Br | —CH₂CH₂CH₂OCH₂CH₂OCH₃ | —CH₂CH₂OC₂H₅ |
| Br | Br | —CH₂CH₂CH₂OCH₂CH₂O—Ph | CH₃ |
| Br | Br | —CH₂CH₂CH₂OCH₂CH₂O—Ph | C₂H₅ |
| Br | Br | —CH₂CH₂CH₂OCH₂CH₂O—Ph | n-C₃H₇ |
| Br | Br | —CH₂CH₂CH₂OCH₂CH₂O—Ph | n-C₄H₉ |
| Br | Br | —CH₂CH₂CH₂OCH₂CH₂O—Ph | —CH₂CH₂OCH₃ |
| Br | Br | —CH₂CH₂CH₂OCH₂CH₂O—Ph | —CH₂CH₂OC₂H₅ |

II. APPLICATION EXAMPLES

Example II.1

1 Part by Weight of the Dye of Formula

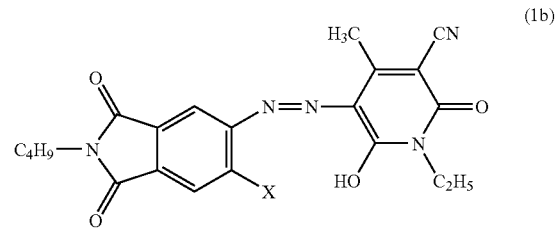

(1b)

is ground in a sand mill, together with 17 parts by weight of water and 2 parts by weight of a commercially available dispersant of the dinaphthylmethane disulfonate type, and converted into a 5% aqueous dispersion.

Using that formulation, a 1% dyeing (based on the dye and the substrate) is produced on woven polyester fabric by the high-temperature exhaust process at 130° C. and is cleared reductively. The violet dyeing obtained in that manner has very good in-use fastness properties, especially excellent fastness to washing.

The same good fastness properties can be achieved when woven polyester fabric is dyed in the thermosol process (10 g/liter of dye, liquor pick-up 50%, fixing temperature 210° C.).

What is claimed is:

1. A dye of formula

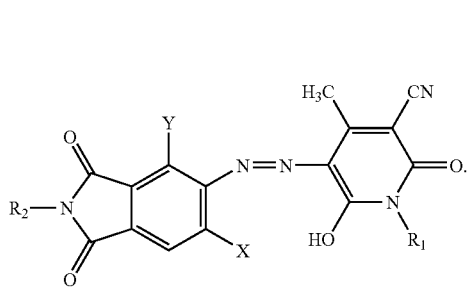

(I)

wherein $R_1$ is $C_1$–$C_{12}$alkyl or —$C_nH_{2n}$—$(OCH_2CH_2)_m$—$OR_3$, n being a number from 2 to 8, m being a number from 0 to 4 and $R_3$ being $C_1$–$C_{12}$alkyl, $C_6$–$C_{24}$aryl or $C_6$–$C_{24}$aralkyl, $R_2$ is n-butyl, X is halogen and Y is hydrogen, chlorine or bromine.

2. A dye of formula (1) according to claim 1, wherein $R_1$ is methyl, ethyl or n-butyl.

3. A dye of formula (1) according to claim 1, wherein X is bromine.

4. A dye of formula (1) according to claim 1, wherein Y is hydrogen.

5. A dye of formula (1a), (1b) or (1c)

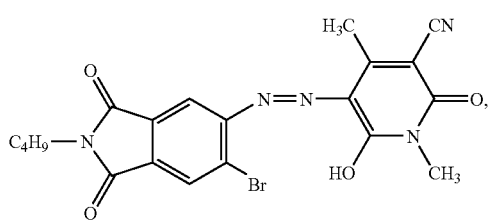

(1a)

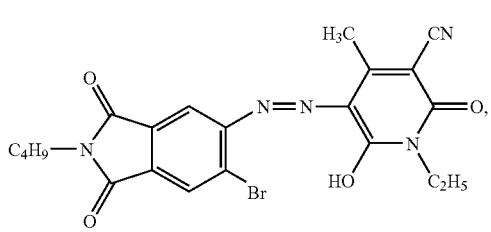

(1b)

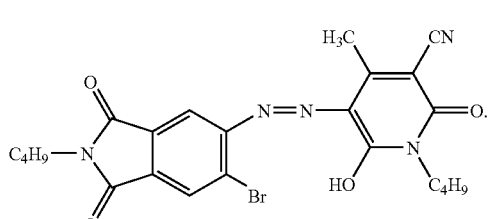

(1c)

6. A process for the preparation of a dye of formula (1d),

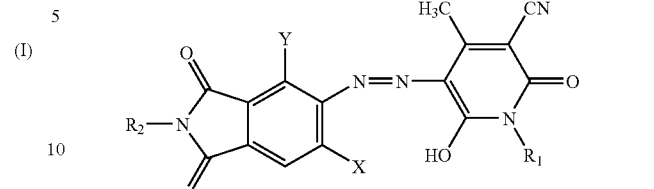

(1d)

wherein $R_1$ is $C_1$–$C_{12}$alkyl or —$C_nH_{2n}$—$(OCH_2CH_2)_m$—$OR_3$, n being a number from 2 to 8, m being a number from 0 to 4 and $R_3$ being $C_1$–$C_{12}$alkyl, $C_6$–$C_{24}$aryl or $C_6$–$C_{24}$aralkyl, $R_2$ is methyl, ethyl, n-propyl, n-butyl, 2-methoxyethvl or 2-ethoxyethyl, X is halogen and Y is hydrogen, chlorine or bromine which comprises nitration of a phthalimide of formula

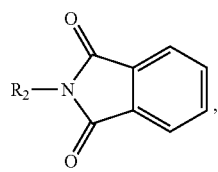

(2)

in the acid range, followed by alkylation of the resulting nitro compound and, by means of a reductive treatment, conversion into an intermediate of formula

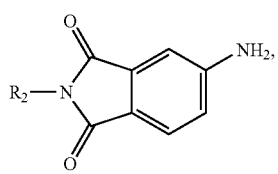

(3)

halogenation of the intermediate of formula (3) in an acid medium and then diazotisation and coupling to a pyridone compound of formula (4)

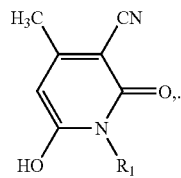

(4)

7. A dye mixture comprising at least two structurally different dyes of formula (1) according to claim 1.

8. A process for dyeing or printing semi-synthetic or synthetic hydrophobic fibre materials, in which process a dye of formula (1) according to claim 1 is applied to the said materials or incorporated into them.

9. A semi-synthetic or synthetic hydrophobic fibre material dyed or printed by the process according to claim 8.

10. A method of dyeing or printing semi-synthetic or synthetic hydrophobic fibre materials, which comprises contacting said fiber materials with at least one dye of formula (1) according to claim 1.

* * * * *